United States Patent Office 3,476,786
Patented Nov. 4, 1969

3,476,786
METHOD FOR PRODUCING FINELY DIVIDED WATER INSOLUBLE METALLIC SALTS OF HIGHER FATTY ACIDS
Robert E. Laily, Verona, and Joseph Cunder, East Orange, N.J., assignors to Diamond Shamrock Corporation, a corporation of Delaware
No Drawing. Continuation-in-part of application Ser. No. 380,061, July 2, 1964. This application Aug. 8, 1967, Ser. No. 659,028
Int. Cl. C11c 1/00
U.S. Cl. 260—413                    4 Claims

ABSTRACT OF THE DISCLOSURE

Finely divided water insoluble metallic salts of higher fatty acids are produced by grinding solid fatty acids with particular solid metals, metal oxides, metal hydroxides, metal carbonates or mixtures thereof in the presence of a catalyst and in the absence of water. A typical example employs solid calcium hydroxide and solid stearic acid in the presence of ammonium carbonate as the catalyst.

Cross-reference to related applications

This application is a continuation-in-part of our copending application Ser. No. 380,061, Lally and Cunder filed July 2, 1964, now abandoned.

This invention relates to a new and improved method of preparing metallic soaps and mixtures of metallic soaps of higher fatty acids. More specifically this invention relates to a new and improved method of producing water-insoluble heavy metal soaps of higher fatty acids having from 10 to about 22 carbon atoms and mixtures thereof in the presence of particular catalysts.

In the past, heavy metallic soaps of higher fatty acids have been prepared by one of two methods. The first method is the precipitation method, in which the heavy metal water-insoluble soap of a higher fatty acid is formed by intermixing an aqueous solution of a water-soluble salt of a heavy polyvalent metal such as the acetate, chloride, sulfate, nitrate, etc. salts of lead, calcium, barium, magnesium, aluminum, zinc, etc. with an aqueous solution containing the water-soluble alkali metal salt of the fatty acid and allowing the water-insoluble metal soap to precipitate out of solution. This precipitation procedure suffers from many serious disadvantages. In carrying out this procedure, it is necessary to wash the precipitated soap particles prepared by this method with large volumes of water in order to remove water-soluble salts, i.e., sodium chloride, sodium sulfate, etc. which become entrained in the particles of the precipitated heavy metal soap. This washing step requires large and expensive equipment in order to handle the large volume of water which is utilized to remove the water-soluble salts. Furthermore this washing procedure is extremely time consuming causing serious time delays in producing the final product. An additional disadvantage inherent in this process is the fact that the washed precipitated heavy metal soap product contains as much as 80% by weight of water entrained and adsorbed within the metallic soap. In utilizing these metal soaps, it is necessary that these products be in an anhydrous powdery state so that they may be easily and economically shipped. Furthermore many of these heavy metal soaps are utilized in water-free systems such as in paints, lacquers and sanding sealers, etc., making it necessary to remove all of the water from the precipitated metallic soap during processing. Since the metal soaps produced by the precipitation method contain a great amount of trapped water, it is very expensive and time consuming to dry thoroughly the product so that the final metal soap product does not contain any trapped water and is in an essentially anhydrous state. Another disadvantage inherent in the precipitation method is that the final dried metal soap is in the form of a cake which must be ground into a fine powder so that it may effectively be utilized in such systems as paints, lacquers, varnishes, etc. This caking of the final dried metal soap product produced by the precipitation method occurs during the drying step since as the entrained or adsorbed water is driven off from the metal soap, the metal soap forms into a cake. This lumpy caked final product must then be ground into a fine powder in order that it can be utilized in its many applications.

The second method which is utilized to prepare water-insoluble heavy metal soaps of higher fatty acids is the fusion technique in which an oxide, hydroxide, carbonate or acetate of a heavy metal is added to a molten fatty acid and reacted at high temperatures to form the metal soaps, i.e., at a temperature of above the melting point of the heavy metal soap being formed. This procedure suffers from the obvious disadvantage that temperatures as high as 400° F. are necessary in order to carry out the reaction. This entails utilizing expensive high temperature equipment and complicated handling procedures in order to carry out this procedure. Furthermore, in utilizing this method, the high reaction temperature must be maintained for a long period of time, usually for a period of time of about eight hours or longer to allow the reaction to go to completion. Another disadvantage inherent in the fusion technique occurs by means of the fact that the molten metal soap which is produced by this method forms into large lumps when it is solidified by cooling. Hence, it is necessary to grind these lumps into a fine powder so that the metal soap can be utilized in its many applications. This additional grinding step is both time consuming and costly.

An object of this invention is to provide a more economical method for the preparation of heavy metal soaps of higher fatty acids. A further object of this invention is to provide a method for preparation of heavy metal soaps of higher fatty acids without utilizing water or temperature above the melting point of the metallic soap. Another object of this invention is to provide a new and improved method for producing heavy metal soaps in dry powdery form in the presence of particular catalysts and in the absence of water without utilizing any drying equipment or procedures. Other objects will in part be obvious and will in part appear hereinafter.

We have unexpectedly discovered that heavy metal soaps in a fine anhydrous powdery state can be formed by the direct inter-reaction of a solid anhydrous metal component selected from the group consisting of polyvalent metals, oxides of polyvalent metals, hydroxides of polyvalent metals, carbonates of polyvalent metals and mixtures thereof with at least one solid anhydrous fatty acid containing from 10 to 22 carbon atoms in the presence of particular catalysts and in the absence of water at ambient temperatures by the continual subdivision of the solid particles by various methods of grinding. In this manner metal soaps of fatty acids can be produced in a dry powdery state without utilizing any water or temperatures above the melting point of the metal soap of the higher fatty acid. Therefore by use of this method, one can produce metal soaps of fatty acids or mixtures thereof in a dry powdery form economically and efficiently.

The phenomena whereby metal soaps of a fatty acid are produced are not completely understood, since when powdered fatty acids and a solid metal component selected from the group consisting of polyvalent metals, polyvalent metal oxides, polyvalent metal hydroxides and polyvalent metal carbonates are simply mixed at room temperature, only a very slight degree of inter-reaction takes place between the fatty acid and the metal component. However, we believe these results are attributable to the fact that by continual abrasion or continual subdivision of the surfaces of the particles, the active surfaces of the metallic components and the fatty acid are continually exposed in the presence of particular catalysts and in the absence of water which allows the reaction of the fatty acid and the metal component to proceed continuously to form the metal soap.

Generally the method of this invention can be carried out by adding a fatty acid in a solid anhydrous form to a solid, anhydrous metallic component such as a polyvalent metal, particularly the divalent metals or aluminum in the presence of particular catalysts and in the absence of water to form a mixture of these two solid substances. The metallic component may be in the form of a metal itself or it may be in the form of the carbonate, oxide or hydroxide of the metal. Any means of abrasion or grinding of this mixture containing tre aforementioned solid particles may be employed, in accordance with this invention, to produce the metal soap of a fatty acid in a fine, powdery, anhydrous state. Typical methods of grinding to subdivide continually the particles which may be utilized in accordance with this invention include high speed agitation, ball milling, air milling, jet milling, hammer milling, stone milling, tumbling in barrels, etc. While the above are illustrative of some of the methods of grinding which may be utilized to continually subdivide the particles, any method of continual subdivision of these particles may be utilized in accordance with the invention. Continuous subdivision of the particles by means of grinding should take place for a period of at least 10 minutes. Generally, it is preferred to carry out the continuous subdivision of these particles for a period of from about 15 minutes to about 30 hours or longer. We have found that when these grinding procedures are used for periods of less than about 10 minutes a complete inter-reaction between the metallic component and the solid fatty acid particles is not obtained. Grinding times for periods of above 30 hours may be utilized in accordance with this invention; however, in most cases we have found that no additional benefits result from using grinding times above ten hours. Therefore, it is seldom, if ever, necessary to utilize such prolonged periods of grinding. Elevated reaction temperatures are not necessary although heat may be applied. However, if heat is applied, care should be taken so that the temperature of the mixture never exceeds the melting point of the resultant metal soap. However, since the reaction proceeds well at ambient temperatures, it is seldom desirable to apply external heat.

One or more anhydrous catalysts are incorporated into the mixture of the metallic component and the fatty acid to produce the powdered metal soap in accordance with this invention. Typical catalysts which are utilized in producing metal soaps of fatty acid in accordance with this invention include any anhydrous water-soluble inorganic basic salt, any anhydrous water-soluble inorganic acid salt, any water-soluble organic amine base and mixtures thereof. Among the compounds which are included in these classes and which may be utilized in accordance with this invention are ammonium carbonate, sodium carbonate, ammonium chloride, methanol amine, ethanol amine, diethanol amine, methyl ethanol amine, propanol amine, amyl amine, dibutyl amine, dimethylamine, ethyl amine, diethyl amine, ethylene diamine, potassium carbonate, ammonium sulfate, ammonium bicarbonate, ammonium nitrate and potassium bicarbonate. The amount of catalyst utilized in accordance with this invention can be varied, however, it is generally preferred to utilize from about 0.1% to about 5.0% by weight of the catalyst based on the weight of the fatty acid used.

By means of the process of this invention, one can produce water-insoluble acid metal soaps of fatty acid, water-insoluble basic metal salts of fatty acid and water-insoluble neutral salts of fatty acid. If a basic metal soap is desired, a substantial excess of the metal component over and above that theoretically required to react completely with all of the fatty acid present is employed whereas if a neutral metal soap is desired, the metallic component is present in the stoichiometric amount required to react with all of the fatty acid present. However, if an acid metal soap is desired, less than the stoichiometric amount of the metal component than that required to react with all of the fatty acid present, is present in the mixture.

The fatty acid used in the present invention can be either saturated or unsaturated acid having a carbon chain of from about 10 to 22 carbon atoms as well as a mixture of two or more of the above acids. Furthermore, the acids may be substituted or unsubstituted. Typical functional groups which may be present in the acid include hydroxy, chlorine, bromine, etc. Typical acids which can be utilized in accordance with this invention include lauric acid, myristic acid, behenic acid, oleic acid, palmitic acid, stearic acid, ricinoleic acid, hydrogenated tallow fatty acids, hydroxy stearic acid, the fatty acids of hydrogenated castor oil, erucic acid, coconut oil fatty acids, etc. and mixtures of these with each other or with acids such as 9,10 oxylauric acid, 9,10 oxystearic acid, chloromethoxy stearic acid, 9,10 diketo stearic acid, phenyl stearic acid, etc. or palmitolic acid, stearolic acid, behenolic acids, etc. Such acids are well known articles of commerce and are frequently used in the form of mixtures such as commercial stearic acid, lauric acid or the like. Commercial acids are mixtures of saturated and unsaturated fatty acids of varying carbon chains.

The metal soaps to which this present invention applies are those of polyvalent metals, particularly the divalent or trivalent metals such as calcium, magnesium, lead, barium, strontium, zinc, iron, cadmium, aluminum, nickel, copper, tin, and mixtures of the above. The solid metallic component which is ground with the fatty acid to form metal soaps in accordance with this invention can be either the metal itself or metallic oxides, metallic hydroxides or metal carbonates or may consist of mixtures of the above. Typical metallic compounds which may be utilized to produce the metallic fatty acid soap in accordance with this invention include cadmium oxide, aluminum oxide, zinc carbonate, ferrous oxide, cadmium carbonate, calcium carbonate, aluminum hydroxide, calcium hydroxide, lead oxide, lead hydroxide, magnesium oxide, magnesium carbonate, cadmium oxide, cadmium hydroxide, zinc oxide, barium hydroxide, zinc hydroxide, etc.

For a fuller understanding of the nature of this invention reference is given to the following examples which are merely for purposes of illustration and are not to be construed in a limiting sense.

In the following examples the free fatty acid content of the metal salt was determined as follows:

A two gram sample of the solid metal soap prepared in the following examples was placed in a 250 ml. beaker. 100 grams of ethanol was then added to the beaker to extract the unreacted fatty acid from the metal soap. After 10 minutes of stirring, the mixture in the beaker was a two phase system, one phase consisted of the solid metal soap and the other phase consisted of liquid ethanol having dissolved therein the unreacted fatty acid. The liquid ethanol phase was separated from the solid metal phase by filtration. After filtration, the free fatty acid content was determined by titrating the ethanol phase to a pH of about 7 with 0.05 N sodium hydroxide. The free acid content reported in all of the following examples was determined as if the free acid contained in the ethanol phase was stearic acid. The free acid reading indicated what percentage of the acid originally employed reacted to form the metal soap. Hence, the lower the free acid reading the more the reaction had gone to completion.

Example I 800 parts by weight of dry powdered stearic acid and 180 parts by weight of anhydrous powdered calcium hydroxide were mixed in a small drum. This mixture was then rotated on a roller mill for 24 hours. After this period the stirred mixture was ground through a Raymond Hammer Mill utilizing a ¼ inch screen. The product thus obtained was an unctuous free-flowing powder. A small portion of the powder was removed and analyzed to determine the free fatty acid content. The free fatty acid content of this mixture was 37% denoting that the reaction between the stearic acid and calcium hydroxide had been substantial.

Example II 800 parts by weight dry, powdered stearic acid, 180 parts by weight of anhydrous powdered calcium hydroxide and 16 parts by weight of anhydrous ammonium carbonate as a catalyst were mixed in a small drum. This mixture was then ground by rolling on a roller mill for one and one-half hours. After this period the material was ground by one pass through an air mill. The product thus obtained was an unctuous free-flowing powder having a free fatty acid content of 19% indicating that stearic acid and calcium hydrate had substantially reacted.

Example III 200 parts by weight of flaked stearic acid, 252 parts by weight of powdered anhydrous lead oxide were mixed in a small tank. This mixture was ground for 24 hours in a one gallon porcelain ball mill which was one-half filled with one inch diameter porcelain balls. The reaction product was still yellow in color indicating that reaction was incomplete after 24 hours of grinding.

Example IV 100 parts by weight of flaked anhydrous stearic acid, 126 parts by weight of powdered anhydrous lead oxide and 10 parts by weight of powdered anhydrous ammonium carbonate as a catalyst were mixed in a small tank. This mixture was ground for 24 hours in a one galoln porcelain ball mill which was one-half filled with one inch diameter porcelain balls. The final product was a fine white powder having a free fatty acid content of about 3%. The reaction product was white in color indicating that reaction was substantially complete after 24 hours of grinding.

What is claimed is:

1. A process for production of finely divided metal salts of fatty acids consisting essentially of the steps of providing an anhydrous mixture consisting essentially of a solid, anhydrous fatty acid having from about 10 to 22 carbon atoms and a solid, anhydrous metallic component which is selected from the group consisting of calcium hydroxide and lead oxide and continually subdividing said solid mixture by grinding in the presence of anhydrous ammonium carbonate catalyst and in the absence of water while maintaining the temperature of said mixture below the melting point of said metal salt thereby forming said finely divided metal salt.

2. The process of claim 1 wherein said solid metallic component is calcium hydroxide.

3. The process of claim 1 wherein said metallic component is lead oxide.

4. The process of claim 1 wherein said solid fatty acid is stearic acid.

References Cited

UNITED STATES PATENTS

| 2,267,148 | 12/1941 | Boner | 260—414 |
| 2,466,925 | 4/1949 | Brauner | 260—414 XR |
| 2,528,803 | 11/1950 | Unkefer | 260—413 XR |
| 2,650,932 | 9/1953 | Kebrich et al. | 260—413 |
| 2,890,232 | 6/1959 | Rogers et al. | 260—413 XR |
| 3,028,247 | 4/1962 | Molnar | 260—414 XR |
| 3,124,475 | 3/1964 | Fischer et al. | 260—413 XR |

FOREIGN PATENTS

| 4,092 | 1/1906 | Great Britain. |
| 587,258 | 4/1947 | Great Britain. |
| 1,393,678 | 2/1965 | France. |

LEON ZITVER, Primary Examiner

HOWARD T. MARS, Assistant Examiner

U.S. Cl. X.R.

260—414